(12) United States Patent
Marzano

(10) Patent No.: US 11,052,766 B2
(45) Date of Patent: Jul. 6, 2021

(54) SOLID STATE ENERGY STORAGE AND MANAGEMENT SYSTEM

(71) Applicant: Velocity Magnetics, Inc., New Castle, PA (US)

(72) Inventor: Domenic P. Marzano, New Castle, PA (US)

(73) Assignee: Velocity Magnetics, Inc., New Castle, PA (US)

( * ) Notice: Subject to any disclaimer, the term of this patent is extended or adjusted under 35 U.S.C. 154(b) by 0 days.

(21) Appl. No.: 16/102,061

(22) Filed: Aug. 13, 2018

(65) Prior Publication Data

US 2018/0345797 A1  Dec. 6, 2018

Related U.S. Application Data

(63) Continuation of application No. 14/505,476, filed on Oct. 2, 2014, now Pat. No. 10,046,644.

(Continued)

(51) Int. Cl.
*B60L 7/28* (2006.01)
*B60L 15/00* (2006.01)
(Continued)

(52) U.S. Cl.
CPC .................. *B60L 7/28* (2013.01); *A63G 7/00* (2013.01); *B60L 15/005* (2013.01); *B60L 50/40* (2019.02);
(Continued)

(58) Field of Classification Search
CPC ... B60L 7/28; A63G 7/00; H02J 7/345; H02P 31/00; Y02T 10/645
(Continued)

(56) References Cited

U.S. PATENT DOCUMENTS 3,865,043 A  2/1975  Schwarzler
3,974,778 A  8/1976  Black et al.
(Continued)

FOREIGN PATENT DOCUMENTS

CN  102723763 A  10/2012
DE  102010062362 A1  6/2012
(Continued)

OTHER PUBLICATIONS

International Search Report and Written Opinion of related International Application No. PCT/US2014/058921, dated Jan. 14, 2015.

(Continued)

*Primary Examiner* — Muhammad S Islam
*Assistant Examiner* — Devon A Joseph
(74) *Attorney, Agent, or Firm* — The Webb Law Firm

(57) ABSTRACT

Systems and methods for energy storage and management may be useful for a variety of applications, including launch devices. A system can include a direct current (DC) bus configured to operate within a predetermined range of voltages. The system can also include an array comprising a plurality of ultra-capacitors connected to the DC bus and configured to supply the DC bus with energy. The system can further include an input configured to receive energy from a power grid, wherein the power grid is configured to supply fewer than 250 amps of power. The system can additionally include an output configured to supply more than 250 amps of power. The system can also include a controller configured to control charging and discharging of the array of ultra-capacitors and configured to control the DC bus to remain within the predetermined range of voltages.

14 Claims, 3 Drawing Sheets

Related U.S. Application Data

(60) Provisional application No. 61/885,968, filed on Oct. 2, 2013.

(51) Int. Cl.
| | |
|---|---|
| *H02J 7/34* | (2006.01) |
| *A63G 7/00* | (2006.01) |
| *H02P 31/00* | (2006.01) |
| *B60L 50/40* | (2019.01) |
| *B60L 53/22* | (2019.01) |
| *B60L 13/03* | (2006.01) |

(52) U.S. Cl.
CPC .............. *B60L 53/22* (2019.02); *H02J 7/345* (2013.01); *H02P 31/00* (2013.01); *B60L 13/03* (2013.01); *Y02T 10/64* (2013.01); *Y02T 10/70* (2013.01); *Y02T 10/7072* (2013.01); *Y02T 90/12* (2013.01); *Y02T 90/14* (2013.01)

(58) Field of Classification Search
USPC ........................................................ 318/135
See application file for complete search history.

(56) References Cited

U.S. PATENT DOCUMENTS

| | | | | |
|---|---|---|---|---|
| 4,061,089 A | | 12/1977 | Sawyer | |
| 4,165,695 A | | 8/1979 | Schwarzkopf | |
| 4,343,223 A | * | 8/1982 | Hawke | H05H 1/54 |
| | | | | 124/3 |
| 4,697,131 A | † | 9/1987 | Schauder | |
| 4,881,446 A | * | 11/1989 | Marks | B64G 1/002 |
| | | | | 89/8 |
| 4,958,115 A | | 9/1990 | Miller | |
| 5,221,863 A | * | 6/1993 | Motegi | H03K 5/133 |
| | | | | 327/157 |
| 5,260,642 A | * | 11/1993 | Huss | H02K 16/00 |
| | | | | 322/51 |
| 5,821,658 A | * | 10/1998 | Boggs, III | H02K 11/215 |
| | | | | 310/105 |
| 6,060,847 A | | 5/2000 | Hettema et al. | |
| 6,170,402 B1 | | 1/2001 | Rude et al. | |
| 6,253,885 B1 | * | 7/2001 | Tsai | H02K 49/043 |
| | | | | 188/158 |
| 6,348,004 B1 | | 2/2002 | Houben | |
| 6,439,129 B2 | | 8/2002 | Begotti | |
| 6,499,701 B1 | * | 12/2002 | Thornton | B60L 13/06 |
| | | | | 246/194 |
| 6,755,749 B2 | | 6/2004 | Stengel | |
| 7,061,131 B2 | † | 6/2006 | King | |
| 7,918,741 B2 | | 4/2011 | Hunter et al. | |
| 8,038,542 B2 | | 10/2011 | Hunter et al. | |
| 8,136,453 B2 | | 3/2012 | Hunter et al. | |
| 8,198,890 B2 | | 6/2012 | Derfiora | |
| 8,378,608 B2 | | 2/2013 | Robertson | |
| 8,727,078 B2 | * | 5/2014 | Marzano | B61H 7/083 |
| | | | | 188/164 |
| 8,826,824 B2 | | 9/2014 | Hunter et al. | |
| 8,963,026 B2 | | 2/2015 | Kramer | |
| 9,124,147 B2 | | 9/2015 | Kramer | |
| 10,046,644 B2 | * | 8/2018 | Marzano | H02P 31/00 |
| 2002/0103033 A1 | | 8/2002 | Stengel | |
| 2002/0177929 A1 | * | 11/2002 | Kumar | B60L 15/2045 |
| | | | | 701/19 |
| 2003/0019388 A1 | | 1/2003 | Spieldiener et al. | |
| 2004/0070286 A1 | * | 4/2004 | Marzano | H02K 41/031 |
| | | | | 310/12.18 |
| 2005/0039630 A1 | * | 2/2005 | Kumar | B60L 50/15 |
| | | | | 105/35 |
| 2005/0178632 A1 | * | 8/2005 | Ross | B60L 5/005 |
| | | | | 191/10 |
| 2005/0263331 A1 | | 12/2005 | Sopko et al. | |
| 2005/0263356 A1 | | 12/2005 | Marzano et al. | |
| 2007/0142985 A1 | * | 6/2007 | Kumar | F02D 19/0665 |
| | | | | 701/22 |
| 2007/0207866 A1 | | 9/2007 | Hunter | |
| 2007/0207867 A1 | | 9/2007 | Hunter | |
| 2007/0207869 A1 | | 9/2007 | Hunter | |
| 2008/0021602 A1 | * | 1/2008 | Kingham | B60L 9/00 |
| | | | | 701/19 |
| 2008/0053299 A1 | * | 3/2008 | Taylor | F41B 6/006 |
| | | | | 89/8 |
| 2008/0257662 A1 | | 10/2008 | Kunz | |
| 2008/0283348 A1 | | 11/2008 | Evans | |
| 2009/0114114 A1 | | 5/2009 | Rose et al. | |
| 2009/0177595 A1 | * | 7/2009 | Dunlap | B60L 55/00 |
| | | | | 705/412 |
| 2010/0148750 A1 | | 6/2010 | Derfiora | |
| 2011/0001353 A1 | * | 1/2011 | Emerson | B60L 50/40 |
| | | | | 307/9.1 |
| 2011/0056407 A1 | † | 3/2011 | Roodenburg | |
| 2011/0062786 A1 | * | 3/2011 | Rozman | H02J 3/383 |
| | | | | 307/82 |
| 2011/0115425 A1 | | 5/2011 | Olsson | |
| 2012/0064984 A1 | | 3/2012 | Hunter et al. | |
| 2012/0160124 A1 | * | 6/2012 | Barbee, V | B61C 3/02 |
| | | | | 105/35 |
| 2012/0173065 A1 | * | 7/2012 | Hunter | A63G 21/18 |
| | | | | 701/22 |
| 2013/0025492 A1 | | 1/2013 | Crawford et al. | |
| 2013/0032053 A1 | | 2/2013 | Stoker | |
| 2013/0041514 A1 | | 2/2013 | Apalenek et al. | |
| 2013/0106331 A1 | * | 5/2013 | Guzelgunler | H02P 1/46 |
| | | | | 318/400.21 |
| 2013/0138279 A1 | * | 5/2013 | Shi | B60L 58/20 |
| | | | | 701/22 |
| 2013/0168961 A1 | | 7/2013 | Stahlkopf et al. | |
| 2014/0084817 A1 | | 3/2014 | Bhavaraju et al. | |
| 2014/0085835 A1 | † | 3/2014 | Berry | |
| 2014/0244082 A1 | * | 8/2014 | Caron | B60L 50/61 |
| | | | | 701/22 |
| 2015/0083018 A1 | * | 3/2015 | Clark | B60L 13/10 |
| | | | | 104/282 |
| 2015/0088384 A1 | * | 3/2015 | Darraba | H02P 7/04 |
| | | | | 701/45 |
| 2015/0360581 A1 | * | 12/2015 | King | B60L 15/005 |
| | | | | 104/284 |
| 2016/0121908 A1 | * | 5/2016 | Ahmad | B61B 13/10 |
| | | | | 406/50 |

FOREIGN PATENT DOCUMENTS

| | | |
|---|---|---|
| NL | 1006651 C | 4/1999 |
| WO | 2009120063 A1 | 10/2009 |
| WO | 2013103354 A1 | 7/2013 |

OTHER PUBLICATIONS

Iannuzzi et al., "A New Supercapacitor Design Methodology for Light Transportation Systems Saving", Energy Management Systems, 2011, pp. 183-198.

Maxwell Technologies Investors News Release, 2014, Retrieved from http://investors.maxwell.com/phoenix.zhtml?c=94560&p=irol-newsArticle&ID=1903210.

Miller et al., "Electrochemical Capacitors: Challenges and Opportunities for Real-World Applications", The Electrochemical Society Interface, Spring 2008, pp. 53-57.

Yao et al., "Research and Application of Elevator Energy-Saving Devices with Super Capacitor to Store Energy", Advances in Automation and Robotics, 2011, pp. 429-436, vol. 1.

Unknown, An Electrical Runway, 2 pages, Oct. 25, 1946, The Engineer, https://www.theengineer.co.uk/october-1946-westinghouse-unveils-the-electropult.†

Leonardo Manuel Palma Fanjul, Some New Applications of Supercapacitors in Power Electronic Systems, 113 pages, Sep. 30, 2004, OAKTrust, https://oaktrust.library.tamu.edu/handle/1969.1/26.†

(56) References Cited

OTHER PUBLICATIONS

Hongtao Zhao and Jun Wu, Research on a High Energy Utilization Efficiency Electromagnetic Aircraft Launcher with an Ultracapacitor Bank, 12 pages, 10/00/2008, Institute of Electrical and Electronics Engineers (IEEE), https://ieeexplore.ieee.org/document/4771392.†

\* cited by examiner
† cited by third party

SOLID STATE ENERGY STORAGE AND MANAGEMENT SYSTEM

CROSS REFERENCE TO RELATED APPLICATIONS

This application is a continuation of U.S. patent application Ser. No. 14/505,476, filed Oct. 2, 2014, now issued as U.S. Pat. No. 10,046,644, which claims the benefit and priority of U.S. Provisional Application No. 61/885,968, filed Oct. 2, 2013, the disclosures of which are hereby incorporated herein in their entirety by reference.

BACKGROUND

Field

Certain embodiments of the present invention relate to systems and methods for energy storage and management. For example, certain embodiments relate to systems and methods for solid state energy storage and management.

Description of the Related Art

Traditional systems for energy storage and management, particularly in the amusement ride industry are not adequate. Typically, the park operator has to install a large, for example 1000+ amperage, service along with a very large transformer and large conductors, such as thick wires or cables. This installation has a very high initial cost, and may require the operator to pull power directly from the power grid. Some operators do not have this option due to the size of their electrical infrastructure or where the service would have to be physically installed on their property. Operators who provide moveable or transient rides, such as traveling carnivals, cannot provide certain types of amusement rides because of inadequate power supply.

As an alternative to simply providing very large amperage service, a flywheel generator is sometimes used to store energy from a grid and deliver it to a particular ride. Nevertheless, a flywheel generator and out-building to house and support the generator may be expensive, heavy, and often noisy. Further, the flywheel generator may be unable to store electrical energy converted from kinetic energy efficiently due to mechanical losses or the like.

Amusement park operators typically do not like the idea of pulling the required large amount of energy from the electrical grid at one time and some are not able to install large three phase electrical services at particular geographical locations on the properties. Operators typically do not want the added expense or maintenance of a flywheel generator nor do they want to build a secondary out building to house the generator. With the need to rapidly launch rides, often as recurrently as every 20 to 30 seconds, needs exist for improved systems and methods for energy storage and management, including solid state energy storage and management.

SUMMARY

According to certain embodiments, a system according the present invention can include a direct current (DC) bus configured to operate within a predetermined range of voltages. The system can also include an array comprising a plurality of ultra-capacitors connected to the DC bus and configured to supply the DC bus with energy. The system can further include an input configured to receive energy from any power source, including the lowest energies that are supplied by the line voltages typically used. Thus, the power grid can be configured to supply fax fewer than 250 amps of power. The system can additionally include an output configured to supply more than 250 amps of power. The system can also include a controller configured to control charging and discharging of the array of ultra-capacitors and configured to control the DC bus to remain within the predetermined range of voltages.

In certain embodiments, a method can include operating a DC bus of a system within a predetermined range of voltages. The method can also include supplying the DC bus with energy using an array comprising a plurality of ultra-capacitors connected to the DC bus. The method can further include receiving energy from a power grid via an input of the system. The power grid can be configured to supply fewer than 250 amps of power. The method can additionally include supplying more than 250 amps of power via an output of the system. In certain embodiments, line voltages can be used as a first step in charging the capacitors. The method can also include controlling charging and discharging of the array of ultra-capacitors. Thus, the method can be configured to limit the discharge of the capacitors so that they do not discharge more than about 80%, or preferably about 70% of their fully charged capacity. The discharge could be no more than about 60%, 50%, or 40% of their load. The method can further include controlling the DC bus to remain within the predetermined range of voltages. The capacitor arrays can be air or fan cooled. To make the array more dense, the capacitor array may be refrigerated, liquid cooled, or even cryogenically cooled. The discharge could be all at once or may use multiple pulse inductors to shape all or a portion of the output pulse waveform to the desired load.

A system, according to certain embodiments, can include means for operating a direct current (DC) bus of a system within a predetermined range of voltages. The system can also include means for supplying the DC bus with energy using an array comprising a plurality of ultra-capacitors connected to the DC bus. The system can further include means for receiving energy from a power grid via an input of the system. The power grid can be configured to supply fewer than 250 amps of power for charging/recharging the capacitor array. The system can additionally include means for supplying more than 250 amps of power via an output of the system. The system can be configured with fewer than about 200 amps, 150 amps, 100 amps, 50 amps, or even 20 or less amps for charging the capacitors. The system can also include means for controlling charging and discharging of the array of ultra-capacitors. The system can further include means for controlling the DC bus to remain within the predetermined range of voltages.

A system, according to certain embodiments, can include an ultra-capacitor based launch system. The system can include an output configured to couple to a load; a plurality of ultra-capacitor units; and a switch, wherein the switch operatively couples the plurality of ultra-capacitor units to the output. The plurality of ultra-capacitor units may be coupled to the inductor. The plurality of ultra-capacitors may receive less than 250 amps of power from a power grid in a continuous connection during operation; wherein the plurality of ultra-capacitors outputs more than 250 amps of power to the load to launch a vehicle on a closed track via one or more linear synchronous motors; and wherein the ultra-capacitor based launch system is the only source of energy for the vehicle. Embodiments may also include a recycling system that includes an second energy input for receiving energy from a regenerative braking circuit. The recycling may be accomplished by obtaining power from magnetic braking. The magnetic braking may be eddy current braking utilizing an air gap and a stator. The output may include providing about 250 to 4,000+ amps for approximately 2 to 3 seconds. Output amperage may be greater that about 250, 300, 350, 400, 500, 750, 1,000, 1,500, 2,000, 2,500, 3,000, 4,000 amps or other values or ranges. Discharge times may vary from about 0.1 seconds to 10 minutes, 0.5 seconds to 2 minutes, 1.0 second to 1 minute, 1.5 seconds to 10 seconds, or any other combinations of these ranges.

Additional features, advantages, and embodiments of the invention are set forth or apparent from consideration of the following detailed description, drawings and claims.

Moreover, it is to be understood that both the foregoing summary of the invention and the following detailed description are exemplary and intended to provide further explanation without limiting the scope of the invention as claimed.

BRIEF DESCRIPTION OF THE DRAWINGS

For proper understanding of the invention, reference should be made to the accompanying drawings, wherein.

DETAILED DESCRIPTION

Figure 1:
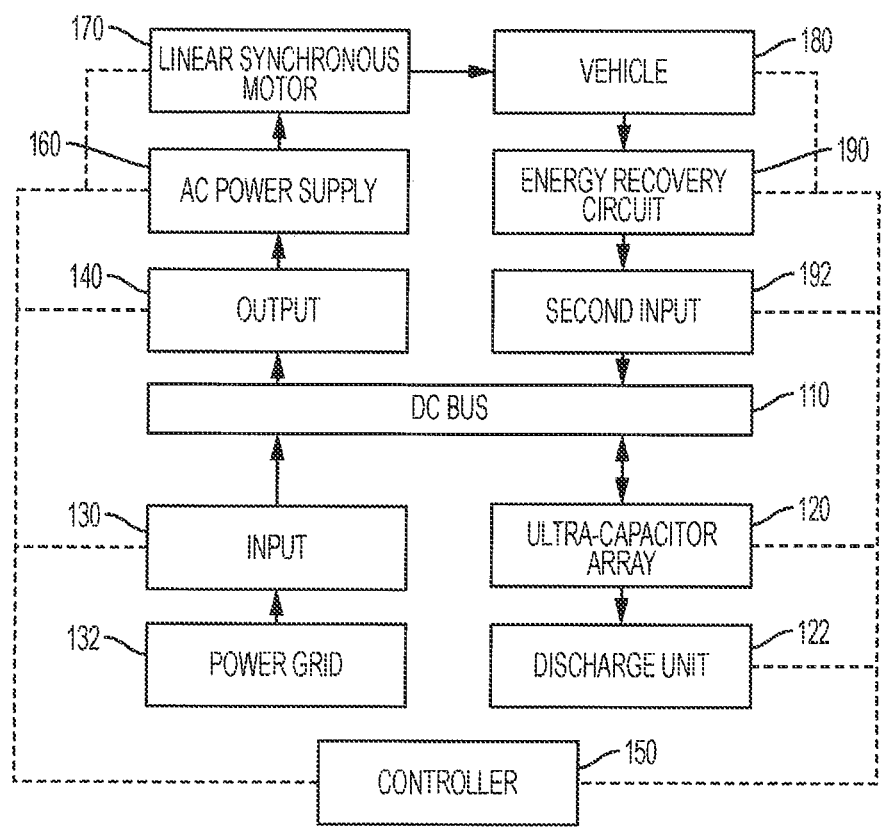
FIG. 1 illustrates a system according to certain embodiments.

Embodiments of the present invention solve many of the problems and/or overcome many of the drawbacks and disadvantages of the prior art by providing systems and methods for energy storage and management. Systems and methods are described for using various tools and procedures for energy storage and management. A system of certain embodiments of the present invention may be referred to herein as an Solid State Energy Storage and Management System. In certain embodiments, the tools and procedures may be used in conjunction with launch devices. The tools and procedures may couple the system with a braking system that can harvest some of the kinetic energy and store the harvested energy for a future discharge or launch. In certain embodiments, the system may be about a 0.5-5 MW system.

The examples described herein relate to amusement park launch devices for illustrative purposes only. The systems and methods described herein may be used for many different industries and purposes, including amusement industries, defense industries, people movers, automotive industries and/or other industries completely. In particular, the systems and methods may be used for any industry or purpose where rapid or slow moving vehicles, sleds, or objects need to be accelerated, driven, frictionlessly (or near-frictionlessly) propelled, or controlled for various purposes. The terms vehicles and sleds are used interchangeably herein.

Certain embodiments may utilize super-capacitors, also known as ultra-capacitors. In certain embodiments, the capacitors are chosen so that the charge time to discharge time can be in the range of about 1:1, 2:1, 3:1, 4:1, 5:1, 10:1, 20:1, 50:1, 100:1, 500:1, 1,000:1, and ranges and various combinations thereof. In certain embodiments the capacitors may charge over a relatively long period of time and then discharge rapidly. Charge times may be about 0.1 seconds, 0.5 seconds, 1 second, 5 seconds, 10 seconds, 20 seconds, 30 seconds, 45 seconds, 1 minute, 2, minutes, 5 minutes, 10 minutes, and other times or ranges. Discharge times may be about 0.0001 seconds, 0.001 seconds, 0.01 seconds, 0.1 seconds, 1 second, 2 seconds, 3 seconds, 5 seconds, 10 seconds, 20 seconds, 30 seconds, 45 seconds, 60 seconds, 2 minutes, 3 minutes, 5 minutes, and other times or ranges. In certain embodiments, this may be useful when relying on an input power source that has a low power input (e.g. 50-250 amps) and may utilize this to output a large amount of power in a short amount of time (e.g., less than 10 seconds). In an embodiment, the capacitors may charge at 200 amps for 30 seconds and then discharge at 6,000 amps in one second. In an embodiment, the capacitors could charge at 200 amps for 30 seconds and discharge at 200 for 30 seconds. In an embodiment including multiple banks of capacitors, the charge and discharge rate can be the same or different amongst the banks. In an embodiment, the system may be used for large energy power storage that can be replenished slowly, about 30-45 seconds, and discharged at about a 1:1 ratio, about 150 amps for about 30 seconds of recharge equals the ability to discharge at 1500 amps for about 3 seconds. These are illustrative examples only and other variations may be used.

Embodiments of the present invention may include one ultra-capacitor or a bank of ultra-capacitors or ultra-capacitor modules connected in series, parallel, or series-parallel for collecting and storing small or large amounts of electrical energy. The electrical energy can then be utilized or released based on the energy consumption needs. The energy may be released at whatever rate the design is intended for. In certain embodiments, the capacitors of the invention allow for repeated, controlled, and rapid (e.g., every 20-50 seconds, more particularly 30-45 seconds) charging and discharging of a particular bank of capacitors. In certain embodiments, the capacitors may allow for the repeated, controlled, and rapid (e.g., less than 30 seconds) charging and discharging of a particular bank of capacitors. In certain embodiments, the system may include multiple banks of capacitors and may allow the system to charge even more rapidly (e.g., under 30 seconds).

Certain embodiments may include a detached solid state energy storage system that has the ability to discharge rapidly at about a 1:1 ratio to store and then supply high energy demands utilizing minimal line energy requirements. An energy management system may be the only energy source that advances a vehicle or sled utilizing one or more linear synchronous motors homogenously with permanent magnets. An energy management system may be connected to line voltage during operation. The energy management system may directly disconnected from our motors and sleds during operation. An energy management system may be discharged and charged to a predetermined limit based upon pre-calculated demands. A single energy storage device may provide the necessary demanded energy over a specific time frame, e.g., about 1500 amps for about 3 seconds. A power system may be detached from the vehicle and may supply power to motors that are detached from the system remotely utilizing a single power source that maintains a constant, predetermined power requirement.

This system can also be utilized to store regenerated energy developed or generated from eddy current braking allowing the customer to convert kinetic energy into electrical energy which ultimately creates an energy consumption savings by collecting and storing the kinetic energy and utilizing it at a later time or event.

It is especially advantageous to combine embodiments of the Solid State Energy Storage and Management System with embodiments set forth in U.S. Pat. No. 8,727,078 regarding magnetic braking systems, which is hereby incorporated by reference in its entirety. In this manner the energy can be efficiently harvested and a device, such as a vehicle, can be efficiently stopped. In U.S. Pat. No. 8,727,078, the air gap and stator may be used to harvest energy. Electrical energy generated by the current eddy braking system may be used to recharge the ultra-capacitors of various embodiments described herein. Thus the stators are not simply passive but utilized to lower the electrical need of the entire ride system. There may be a synergistic relationship between a braking system and the Solid State Energy Storage and Management System.

There may be a variety of ways to construct an ultra-capacitor. For example, ultra-capacitors can include conductive plates that are coated with a porous layer of activated carbon and immersed in an electrolyte. The conductive plates may be made from metal. Each carbon electrode can have two layers of charge on its surface, in use. Thus, ultra-capacitors can also be referred to as double-layer capacitors.

An Solid State Energy Storage and Management System may provide affordable operation of a launch system without large amounts of amperage demand from the power company and without the use of flywheel generators.

Certain embodiments may be useful when utilized in conjunction with a linear or rotary launch system to where a large amount of energy is needed to rapidly accelerate a vehicle or sled uni-directionally or bi-directionally in a very short amount of time. This system may also reduce the electrical service size that would otherwise be very large in terms of amperage to operate such devices. The high energy launch systems may require approximately 250-4000 or more Amps for approximately 2 to 3 seconds of launch time. Amperages for each launch of an exemplary systems may be greater than approximately 250 Amps, 500 Amps, 1,000 Amps, 1,500 Amps, 2,000 Amps, 3,000 Amps, 4,000 Amps, etc. Launch times for exemplary systems may be approximately 0.5 seconds, 1.0 seconds, 1.5 seconds, 2.0 seconds, 2.5 seconds, 3.0 seconds, 3.5 seconds, 4.0 seconds, and higher. The system can similarly be used in connection with linear induction motors, linear accelerators or other systems requiring large bursts of electric energy in a short time.

For certain applications, approximately 150 to 200 Amps for 45 seconds to 1 minute may be used by an average lift hill motor to accelerate a train from a beginning of the lift to the point of release at the top of a hill for classic gravity fed applications. For smaller applications, less energy is needed to power them through their duty cycle. Nearly all amusement parks have 200 amps available to them just about anywhere in the park. Therefore, certain embodiments of the present invention may be able to store enough energy within a period of 30 seconds to perform one launch with as little as 100 amps from a main power grid. In certain embodiments, the power grid may supply 100 amp, 480 VAC three phase power. In certain embodiments, the system is continuously attached to the power grid during operation. The power grid may be the only power supply available for the drive launch modules and motors, according to certain embodiments. Other power supplies may be used depending on particular applications. Other power supplies may include batteries, windmills, nuclear power, solar panels/arrays, thermoelectric devices, and the like. The electrical energy may be stored in a bank of high density ultra-capacitor modules until needed for the launch discharge. Many amusement parks may not have the necessary power or infrastructure available to operate certain rides optimally or at all. These amusement parks, however, may utilize the systems and methods described herein to supply the necessary power to run these rides. Amusement parks may install as many systems as necessary in the park. Lower amperages can be used to charge/recharge the capacitors, but he lower the line amperage provided, the longer the interval of time that may be required between launches. In certain embodiments the system may not need to operate at peak line supply power levels and can provide optimal power outputs even when the input power from the power grid may fluctuate or be reduced.

In certain embodiments, the system is directly connected to the public power grid providing AC power, the power is rectified to DC through the capacitors and an active front end drive (AFE) and/or capacitors may smooth the DC to make nearly pure DC without any harmonic distortion. In certain embodiments, this may eliminate the need for snubber capacitors, snubber circuits, and/or other filters.

For applications where the launch cycle time is less than 30 seconds, the charging time may decrease and amperage may increase to 150-200 Amps. In some applications there may be multiple banks of capacitors that may alternate the charge and discharge rate. This alternation may help to avoid internal heat buildup that may occur during rapid charge and discharge cycle times. In certain embodiments, monitoring equipment including thermometers, temperature sensors, thermal cameras, thermal imaging software and controllers, temperature controllers, and the like may be included.

The system may have a ten year service life or 1,000,000 cycles or more. Other time and cycle amounts are contemplated. Embodiments of the present invention may be more cost effective than a flywheel generator, up to two, three or more times less expensive, and may require little to no maintenance. Certain embodiments may generate little to no noise, in the electrical portion, and may take up less than quarter the space, as compared to a flywheel system.

Thus, certain embodiments may provide energy savings due to the decreased power demand and power grid overload that may occur launching a linear synchronous motor (LSM) system directly from the grid.

Once the system is fully charged with stored power, the system may turn off, unlike a flywheel generator where an electric motor may need to keep the flywheel at a constant revolutions per minute (RPM) even at rest while waiting to release energy. For example, the losses when the system is waiting beyond the recharging time can be minimized in certain embodiments. While there may be some leakage current in the ultra-capacitors, this value may be small compared to the mechanical losses in a flywheel system.

A solid state system may require no periodic maintenance as there may be no moving mechanical parts that wear out. Thus, all the switches involved can be implemented in solid state devices, without requiring mechanical switches. Moreover, unlike lead-acid battery cells, the ultra-capacitors may not require periodic chemical maintenance.

The system may not require a separate or remote facility to be housed in, unlike a flywheel generator. The system may be located in a cabinet directly next to the LSM drive system in the main LSM control room. The cabinet space required to house an embodiment of a 2,000 Amp system may be approximately 24-56" wide×24-56" deep×36-144" height. Other sizes are contemplated for various applications and positioning of capacitors and placement of the system. For instance a 1,200 Amp 1.5 to 2.0 second launch may require approximately 1.0 Mega Joules (Mj) of energy including IR$^2$ losses from heat, connections and stator coil resistance. An embodiment with a 36 w×37 d×84 h system can, in certain embodiments, store and hold 1.4 Mj of energy within the 30 second time period with a three phase 100 amp electrical service.

In certain embodiments, the use of an enclosed system allows for the detachment of the system from the item to be propelled. In some embodiments, the system may be spaced apart from a vehicle as much as a ¼ or a ½ a mile or further. Because certain embodiments allow for physical detachment between the vehicle and the system, the system can be "plug and play" in that it can be easily inserted into any power input (e.g., any public power grid hookup) and provide a predetermined power output. In certain embodiments, the individual components of the system may also be spaced over long distances. In an embodiment, the system can be spaced up to ½ mile away from the motor and the motor can be spaced up to ½ mile away from the vehicle. Certain embodiments, thus, may allow for flexible positioning of the components, which allow for a large variety of footprints associated with the spacing of the system. In certain embodiments, this flexibility may also allow for the use of one system and one transistor array to be connected to multiple vehicles.

In certain embodiments, one system may be associated with multiple transistor arrays that provide power to multiple motors. In an embodiment, the cabinet housing of the system is completely detached from the motor and the motor is not physically connected to the vehicle. In an embodiment, the motor imparts motive force onto the vehicle through a magnet or magnets attached to the vehicle and a magnet or magnets attached to the motor. Magnets may be permanent. The vehicle may not have any separate power source. In certain embodiments, the vehicle may have permanent magnets only used for a drive system. A motor may be detached from the vehicle. In certain embodiments, only a remote motor may be used, such as a linear motor in an amusement park ride. In certain embodiments, linear synchronous motors may be used, which in turn utilize a permanent magnetic rotor. More specifically, the system may manage and store high levels of energy, e.g., 400-4,000+ amps, detached from the motors and located remotely from the motors themselves.

The ultra-capacitor banks may be directly connected to a DC common drive system bus via a contactor or disconnect or possibly both. The ultra-capacitor bank may receive power from an AFE. Certain embodiments may include one or more variable frequency drives (VFDs) and these may draw DC current from the capacitor bank(s). In certain embodiments, the VFDs may include VFD controllers and may utilize pulse width modulation. The DC current can get chopped up into a sine wave. Various techniques for synthesizing a sine wave are permitted. Since the sine wave can be created from DC, there may not be need for complex filters to condition the power. In certain embodiments, there may be an inverter, AC/DC converter, boost converters, buck converters, buck-boost converters and the like may also be included.

In certain embodiments, the input of a linear motor is completely isolated from frequency irregularities in the power grid, in that the power received is always received via the DC bus. In certain embodiments, vehicle propulsion can be achieved with greater consistency.

The ultra-capacitor bank(s) can provide significant advantages during the power stage process. The size of this system may be smaller than the equivalent power front end converter by about 10% to 50%, 20 to 40%, 25% to 30%, etc. The ultra-capacitor banks can provide cleaner power than what is available from the public utility electrical grid. A near perfect sine wave can be produced easily from the inverter and/or the AFE with little distortion in the DC, eliminating the need for snubber capacitor boards and other wave smoothing devices. Alternatively, an embodiment can achieve this with the inverter.

A standard rectified front end may produce at least 30% more harmonics and wave distortions in the sine wave forms. By comparison, the capacitor bank(s) connected to the AFE may produce less than 5% harmonics and distortions.

With the advantages described above, the VFD system may be reduced by at least 30% (not including a flywheel generator and the housing room). The pulse width modulation (PWM) and wave form that the collected and stored energy VFD produces is nearly pure and may not require smoothing capacitors or other accessories that are normally utilized in the current VFD drive systems.

Certain embodiments may include a 1,200 Amp VFD drive system with the ultra-capacitor system connected to a 25 Kw AFE. This drive system may launch a 2250 Kg (4961 lbs.) cart to 35 mph within 1.7 seconds at approximately with 1G of acceleration. The total energy requirement for this launch application may require approximately 309 Kj of energy including IR$^2$ coil losses, connection losses and other miscellaneous losses. The ultra-capacitor bank may have a minimum of 400 Kj of stored electrical energy and the VFD may release this energy through the common bus connection system, manage the energy and utilize it to chop and produce proprietary sine wave forms to drive the stators that may be attached stationary to the track assembly. A three phase 100 Amp 480 VAC service from the public utility grid may be connected to a 25 Kw AFE to where the AFE may charge the ultra-capacitor modules for approximately 20 seconds. Once the capacitor modules are charged the launch system may be ready to execute.

Certain embodiments described herein, and the ultra-capacitors in general, may represent compact and cost effective ways of storing energy, connecting to the common bus system of the VFD and then releasing the energy in a controlled manner.

In certain embodiments, small generators may be used to power smaller rides or rides with slower cycle times. Smaller generators may be used, but may take longer times to charge the capacitors. While certain uses may want 150 Amps to supply a charge time of approximately 30 seconds, smaller amperage may be used with slower recharge times. Any amperage may be used, such as 20, 10, 5, 1, or less to recharge the system with increasing recharge times.

FIG. 1 illustrates a system according to certain embodiments. As shown in FIG. 1, a system can include a direct current (DC) bus 110 configured to operate within a predetermined range of voltages. In certain embodiments, this may include a range of approximately 100-3,000 volts. In certain embodiments, predetermined ranges of voltages may be about 690 V 3 phase, 480 volt, or 750 volts and amounts between these amounts. The bus can be a high voltage bus configured to transport multiple mega watts of power at high voltages with low resistance in DC. Copper bars may be used as an example of the materials for this bus, although other conductive materials are also permitted.

The system can also include an array 120 of a plurality of ultra-capacitors connected to the DC bus and configured to supply the DC bus with energy. The number of ultracapacitors can be selected based on the energy needs of the system. The ultra-capacitors can be provided in modules corresponding to a fixed unit of energy storage representing a maximum suggested energy storage amount of the ultra-capacitors in the module. The ultracapacitors can be shielded from being touched at terminals of the module and array 120.

The system can include a discharge unit 122 that can be connected to the array 120 and can be configured to discharge energy from the array 120 in case of powering down of the array 120. The discharge unit 122 can include a resistor bank that can convert electrical energy into heat, light, or a combination of heat and light. The discharge unit 122 can be configured to completely discharge the array 120 in about 10 to 15 minutes. The discharge unit 122 can be triggered by any powering down event including a detected failure of the power grid, a detected error in a driven system, a detected tampering or other security event, or the like.

The system can also include an input 130 configured to receive energy from a power grid 132. The power grid 132 can be configured to supply fewer than 250 amps of power. The power grid 132 can be a standard power grid provided by a traditional local power company, as typically configured to supply power to residential, commercial, and light industrial customers. Power grid 132 may also include power generating devices. The power grid 132 can supply 120 VAC or 240 VAC to the input 130. Other voltages are also permitted. The input can include an active front-end circuit. The active front-end circuit can take the line voltage to the desired level. For example, an AC line may be rectified to DC, resulting in line voltage DC. In an exemplary embodiment, the line voltage may be 480 VAC, which is 650 VDC. The 650 VDC may then be increased by the active front-end circuit to 750 VDC. Continuing this example, the bus may be kept at 750 VDC and may discharge to approximately 650 VDC after launch. Launches or discharges may deplete a variety of amps from the capacitors. In exemplary embodiments, approximately 50-100 amps may be depleted from capacitors on launch or discharge. In certain embodiments, depletion of the system preferably is less than approximately 60%, 55%, 50%, 45%, 40%, 35%, 30%, 25%, etc.

The system can additionally include a controller 150 configured to control charging and discharging of the array of ultra-capacitors and configured to control the DC bus to remain within the predetermined range of voltages. The controller 150 can be implemented in various ways, including a computer controller including a central processing unit (CPU) or an application specific integrated circuit (ASIC). The controller 150 can be a collection of circuit components that operate together to achieve the controlled functions. The controller 150 can have access to various sensors, not illustrated, if desired. The controller 150 can involve only passive components, in certain embodiments.

The system can further include an output 140 configured to supply more than 250 amps of power. For example, the output can be configured to provide about 250 to 4,000+ amps for approximately 2 to 3 seconds. The output 140 can include a variable frequency drive.

The system can also include at least one three-phase alternating current (AC) power supply 160, which can be provided at the output 140. The AC power supply 160 is configured to be driven by the DC bus 110.

Certain embodiments may also use a current or voltage regulated DC power supply.

The system can additionally include a motor, for example a linear synchronous motor 170, which can be configured to be driven by the AC power supply 160. Other motors, such as a linear induction motor, are also permitted. Likewise, other systems can be driven instead of, or in addition to, a motor.

The system can also include a vehicle 180 configured to be driven by the linear synchronous motor on a closed track (not shown). It is also possible for a vehicle to be launched off an open track. The vehicle may include rollercoaster trolleys, trolleys, train cars, automobiles, passenger transporting devices, and the like.

The system can further include an energy recovery circuit 190 configured to recycle energy discharged through the output at a second input 192. The second input 192 can be configured to receive power from a regenerative braking circuit, which can be installed in connection with, for example, slowing a previously launched vehicle, such as vehicle 180.

Figure 2:
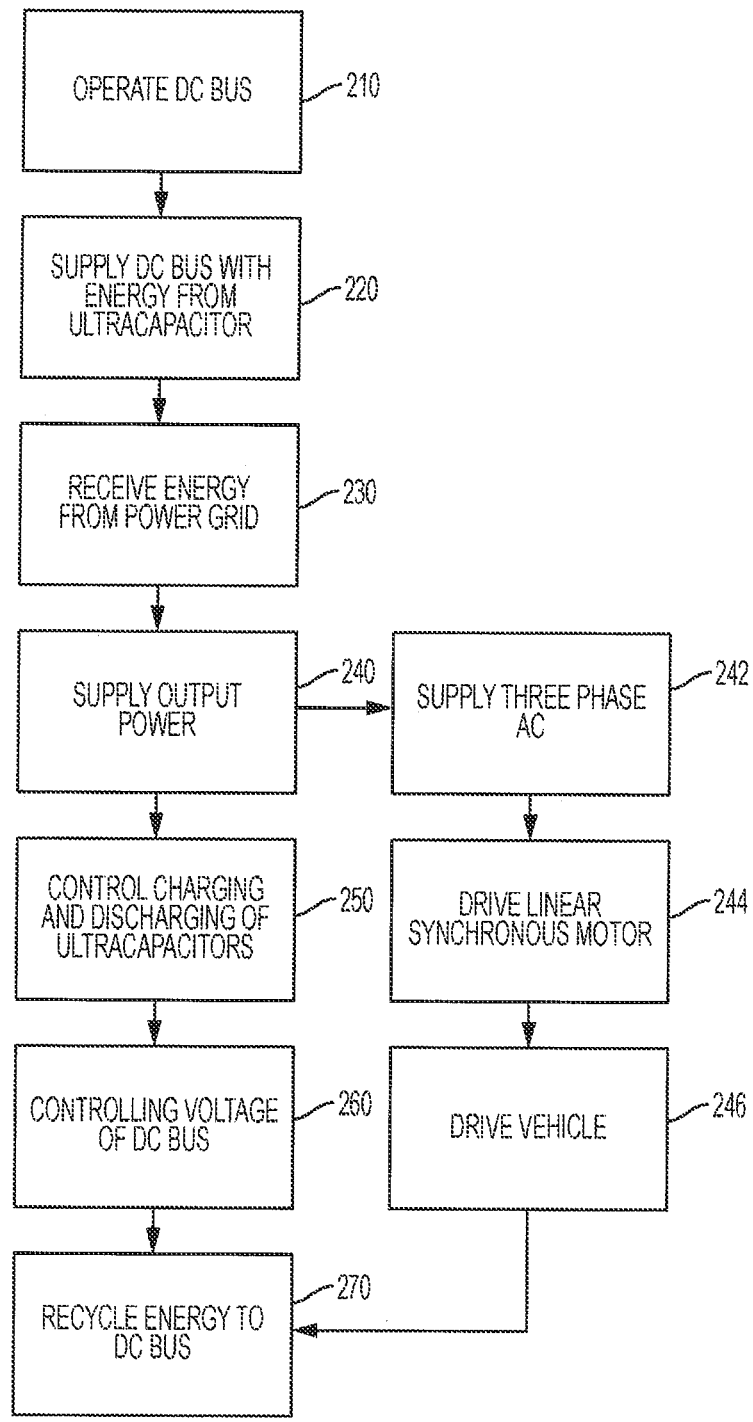
FIG. 2 illustrates a method according to certain embodiments.

FIG. 2 illustrates a method according to certain embodiments. The method can include, at 210 operating a direct current (DC) bus of a system within a predetermined range of voltages. The method can also include, at 220, supplying the DC bus with energy using an array comprising a plurality of ultra-capacitors connected to the DC bus. The method can further include, at 230, receiving energy from a power grid via an input of the system, wherein the power grid may be configured to supply fewer than 250 amps of power.

The method can additionally include, at 240, supplying more than 250 amps of power via an output of the system. The method can also include, at 242, supplying three-phase alternating current (AC) power driven by the DC bus. The method can further include, at 244, driving a linear synchronous motor using the AC power. The method can additionally include, at 246, driving a vehicle on a track using the linear synchronous motor.

The method can also include, at 250, controlling charging and discharging of the array of ultra-capacitors. The method can further include, at 260, controlling the DC bus to remain within the predetermined range of voltages. The method can further include, at 270, recycling, with an energy recovery circuit, energy discharged through the output at a second input, wherein the second input receives power from a regenerative braking circuit.

Embodiments described herein may be widely utilized in the amusement industry, military applications, such as by the Department of Defense for launching drone aircraft, people movers, automotive industry for destructive testing and any other industry where rapid or slow moving vehicles or objects need to be accelerated, driven and or controlled for all types of purposes.

Figure 3B:
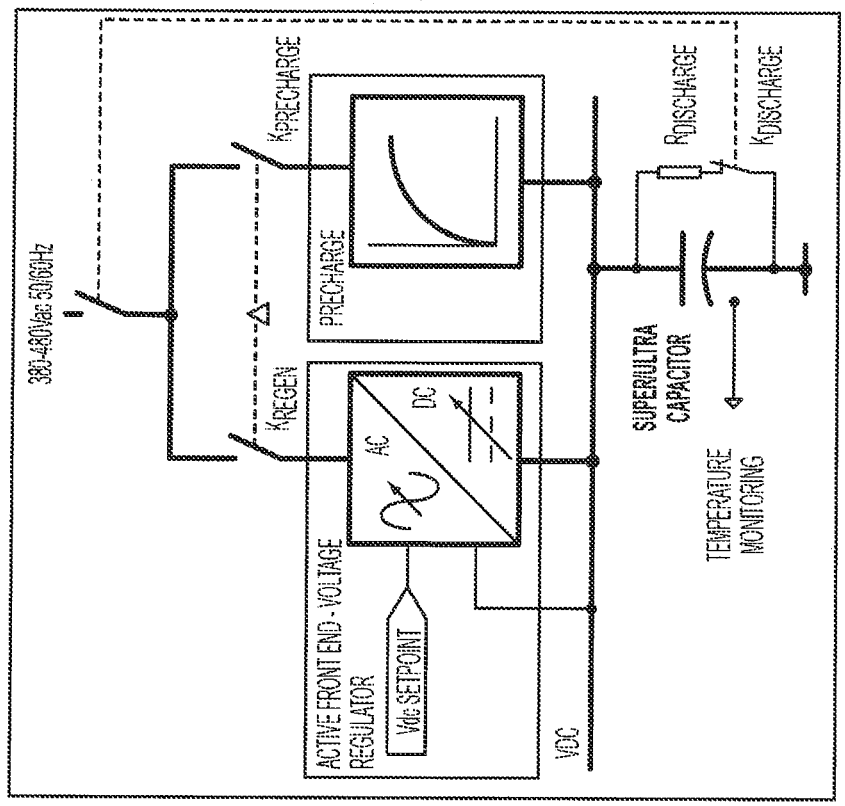
FIGS. 3A-3B illustrate a system according to certain embodiments.
Figure 3A:
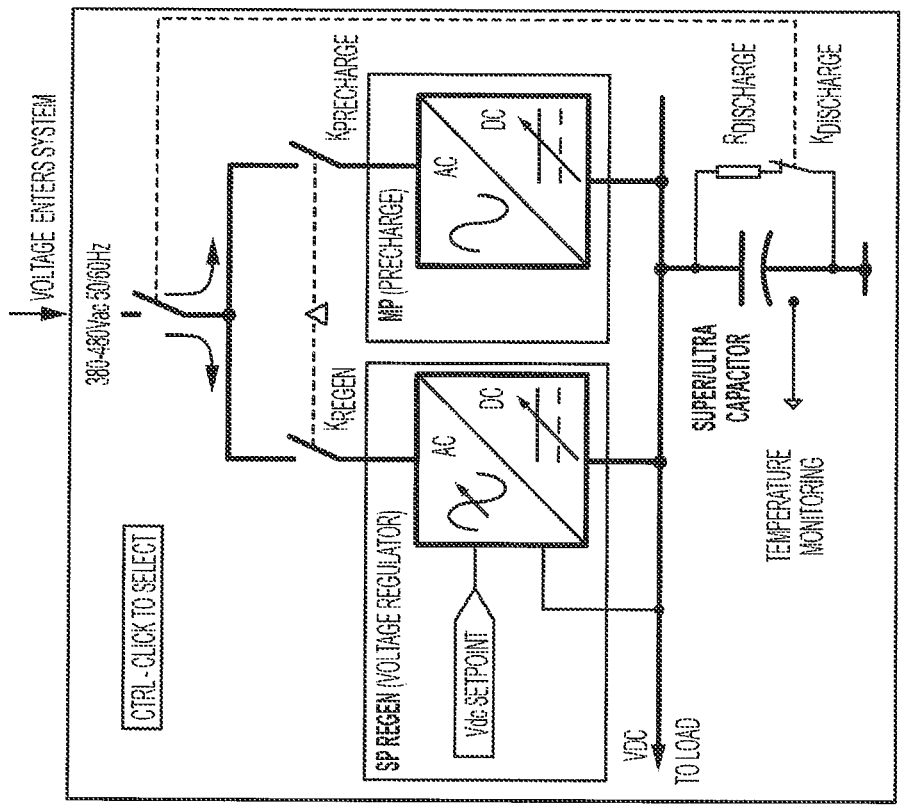

FIGS. 3A-3B describe an exemplary system of the Solid State Energy Storage and Management System. As shown in FIG. 3A, a circuit may be divided into a voltage regulator and a precharge. Voltage may enter the system. In an exemplary embodiment, the voltage may enter from the power grid in a predetermined form, such as at about 380-480 Vac at about 50/60 Hz. The voltage may enter the voltage regulator and/or precharge via one or more switches. Wires may carry current throughout the system, including to a load via an output a Vdc. A differential may exist across a switch ($K_{Regen}$) and a switch ($K_{Precharge}$). An MP (Precharge) may convert the input voltage from AC to DC. An SP REGEN (Voltage Regulator) may regulate voltage. A Vdc setpoint may control the voltage regulator. A super/ultra-capacitor may be provided. The super/ultra-capacitor may be temperature monitored to avoid overheating. A discharge circuit may be provided with a switch ($K_{Discharge}$)

and a resistor ($R_{Discharge}$) FIG. 3B shows an Active Front End—Voltage Regulator and a precharge curve.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A system, comprising:
at least one stator configured to impart motive force to at least one permanent magnet attached to a vehicle by applying a magnetic field from the at least one stator to the at least one permanent magnet to propel the vehicle, wherein the at least one stator is not physically connected to the vehicle; and
at least one cabinet housing not physically connected to the vehicle, the at least one cabinet housing comprising:
a direct current (DC) bus;
an input to the DC bus configured to receive power from a power grid, the power grid not physically connected to the vehicle;
an output configured to supply power having more than 250 amps to an alternating current (AC) power supply for operating the at least one stator;
an array of ultra-capacitors comprising a plurality of ultra-capacitors connected in series-parallel, the array of ultra-capacitors connected to the DC bus and configured to continuously receive power from the power grid via the input and the DC bus during operation of the vehicle, wherein the array of ultra-capacitors is connected to the output and configured to provide power to the output, the array of ultra-capacitors not physically connected to the vehicle; and
a controller configured to control the charging and discharging of the array of ultra-capacitors so the array of ultra-capacitors does not discharge more than 80% of the fully charged capacity of the array of ultra-capacitors.

2. The system of claim 1, wherein the vehicle is on a track.

3. The system of claim 1, wherein the stator comprises at least one stator coil of a linear motor.

4. The system of claim 3, wherein the linear motor comprises at least one of a linear synchronous motor or a linear induction motor.

5. The system of claim 1, further comprising a recycling system comprising an energy input for supplying energy to the array of ultra-capacitors via the DC bus.

6. The system of claim 1, further comprising a regenerative braking circuit obtaining power from magnetic braking of the vehicle on a closed track.

7. The system of claim 6, wherein the magnetic braking is eddy current braking utilizing an air gap and the stator.

8. A method, comprising:
supplying power from a power grid to at least one cabinet housing comprising an input to a direct current (DC) bus;
continuously supplying power from the power grid via the input and the DC bus to an array of ultra-capacitors connected to the DC bus during operation of a vehicle, the array of ultra-capacitors comprising a plurality of ultra-capacitors connected in series-parallel, wherein the least one cabinet housing comprises the array of ultra-capacitors, wherein the at least one cabinet housing is not physically connected to the vehicle, the power grid is not physically connected to the vehicle, and the array of ultra-capacitors not physically connected to the vehicle;
controlling the charging and discharging of the array of ultra-capacitors to supply power from the array of ultra-capacitors to an output connected to the array of ultra-capacitors and so the array of ultra-capacitors does not discharge more than 80% of the fully charged capacity of the array of ultra-capacitors, wherein the at least one cabinet housing comprises the output; and
supplying power having more than 250 amps from the output to an alternating current (AC) power supply to operate at least one stator to impart motive force to at least one permanent magnet attached to the vehicle by applying a magnetic field from the at least one stator to the at least one permanent magnet to propel the vehicle, wherein the at least one stator is not physically connected to the vehicle.

9. The method of claim 8, wherein the vehicle is on a track.

10. The method of claim 8, wherein the stator comprises at least one stator coil of a linear motor.

11. The method of claim 10, wherein the linear motor comprises at least one of a linear synchronous motor or a linear induction motor.

12. The method of claim 8, further comprising supplying, by a recycling system comprising an energy input, energy to the array of ultra-capacitors via the DC bus.

13. The method of claim 8, further comprising obtaining power from magnetic braking of the vehicle by a regenerative braking circuit.

14. The method of claim 13, wherein the magnetic braking is eddy current braking utilizing an air gap and the stator.

* * * * *

UNITED STATES PATENT AND TRADEMARK OFFICE
CERTIFICATE OF CORRECTION

PATENT NO. : 11,052,766 B2
APPLICATION NO. : 16/102061
DATED : July 6, 2021
INVENTOR(S) : Domenic P. Marzano Page 1 of 1

It is certified that error appears in the above-identified patent and that said Letters Patent is hereby corrected as shown below:

In the Claims

Column 12, Line 22, Claim 8, delete "least" and insert -- at least --

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*